UNITED STATES PATENT OFFICE.

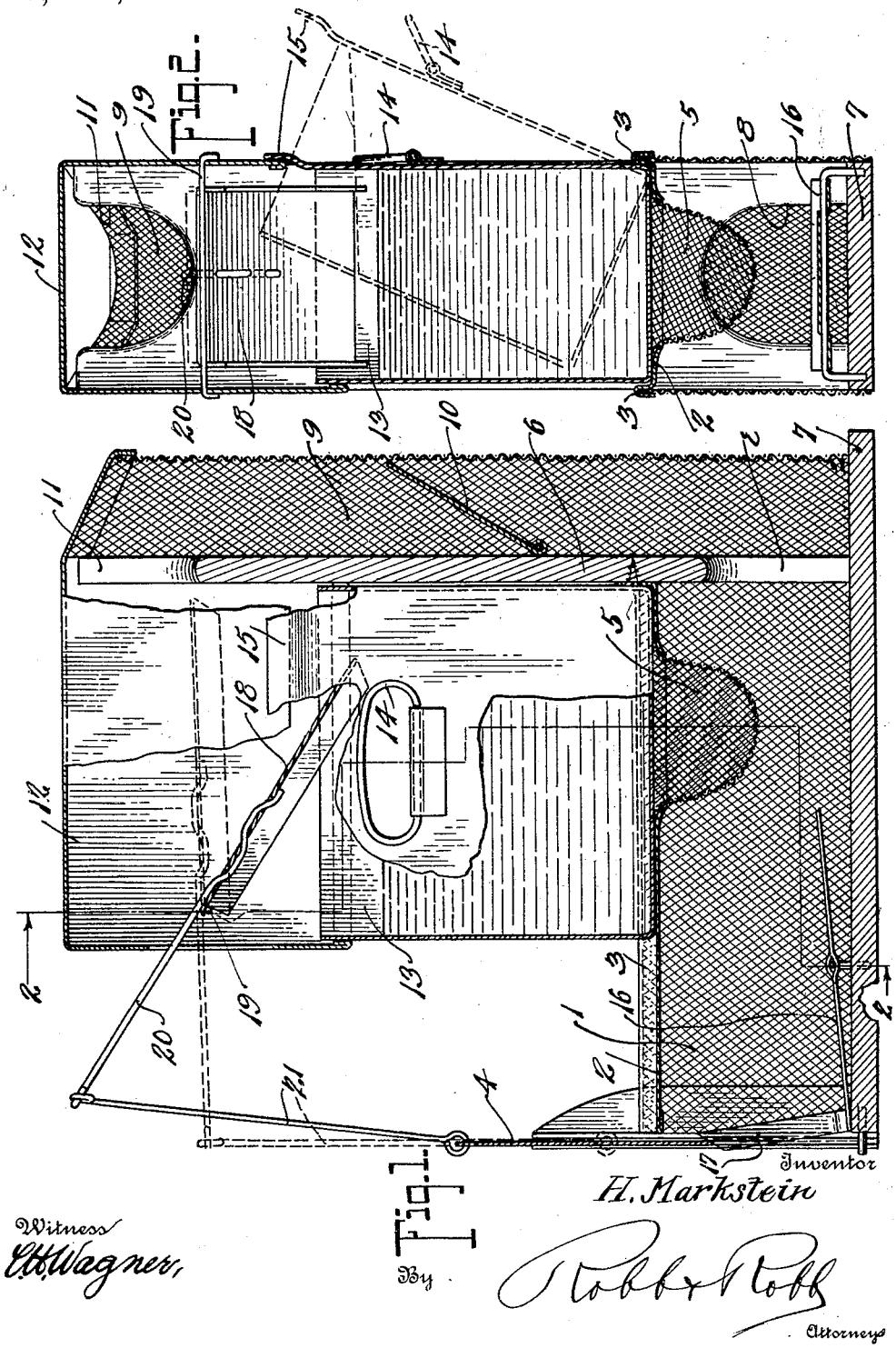

HENRY MARKSTEIN, OF YONKERS, NEW YORK.

AUTOMATIC RAT-TRAP.

1,199,589.  Specification of Letters Patent.  Patented Sept. 26, 1916.

Application filed March 15, 1916. Serial No. 84,308.

*To all whom it may concern:*

Be it known that I, HENRY MARKSTEIN, a citizen of the United States, residing at Yonkers, in the county of Westchester and State of New York, have invented certain new and useful Improvements in Automatic Rat-Traps, of which the following is a specification.

The present invention relates to improvements in animal traps and particularly to that type embodying automatic setting instrumentalities whereby the rodent itself springs and resets the trap in its attempt to obtain access to the bait.

An object of my device is to provide a liquid holding receptacle into which the animal is precipitated, said receptacle being of a movable character but normally held from movement by the setting instrumentalities above referred to, the receptacle being also arranged to constitute a cover for the bait holder.

For a full understanding of the present invention, reference is to be had to the following description and the accompanying drawing, in which:

Figure 1 is a vertical sectional view of a trap constructed in accordance with my invention; and Fig. 2 is a similar sectional view on the line 2—2 of Fig. 1.

Throughout the following detail description, and on the several figures of the drawing, similar parts are referred to by like reference characters.

Referring to the drawing, and specifically describing the invention, the numeral 1 designates an entrance passage to the trap, the walls of which may be of any desired material but as illustrated in the drawing preferably consisting of screen or material of a similar foraminous character.

The entrance passage is covered by a metallic plate 2 having upstanding lateral flanges 3, the entrance to said passage being provided with a vertical sliding door 4. The cover plate 3 just mentioned is provided near its rear portion with an aperture through which is suspended the bait holder or pocket 5. A vertical wall 6 extends upwardly from the rear of the base 7 of the trap and has an opening 8 therethrough at its lower portion communicating with the vertical passageway 9 connected to the rear surface of said wall 6. At an intermediate point in the vertical passage 9 is pivotally mounted a tongue or plate 10 so arranged as to permit of being moved by the rodent in climbing upwardly through the passageway, said plate, however, falling across the passage to prevent the rodent from returning downwardly thereof. At the upper portion, the wall 6 is formed with a second cut-out opening 11 communicating with the forwardly projecting housing 12. The said housing extends over a liquid holding receptacle 13 which is removably disposed upon the cover 2 of the entrance passage and over the bait holder 5, said housing, therefore, constituting a closure means or cover for said receptacle. By reason of the fact that said receptacle is arranged between the flanges 3 of the cover plate 2, it may be given a pivotal or tilting movement so as to bring the said receptacle into a position indicated by dotted lines in Fig. 2 in which position access to the contents of the receptacle is afforded. The upper edge of a side of the receptacle, which is provided with the handle 14 is formed with an extension 15 which coacts with the corresponding side of the housing 12 to prevent movement of said receptacle in the direction opposite to that above referred to. Preferably the front and opposite sides of the housing 12 extend below the mouth of the receptacle so that the latter is adequately held from displacement.

On the floor of the entrance passage and adjacent to the entrance thereof is pivotally mounted a trigger plate 16, the forward end of which is provided with a vertically extending arm 17. This arm when the trap is set engages beneath the raised door 4 and holds said door in open position until the rodent, passing into the entrance passage 1, steps upon the rear portion of the plate 16 whereupon said plate is shifted to disengage the arm 17 from the door permitting the latter to gravitate to closed position. The rodent not being able to obtain access to the bait in the holder 5 from this passage seeks to get at the bait by passing into the vertical passageway 9, climbing the same and entering the housing 12 through the opening 11. In said housing is suitably pivotally supported a trap door 18 carried by the pivot rod 19 and having operative connection with the entrance door 4 through the forwardly extending rod 20 and the connecting rod 21. The entrance door 4 having been closed by the rodent in the manner above described, the trap door 18 assumes the horizontal position shown by the dotted lines of Fig. 1 and in entering the housing 12 the rodent steps upon the free end of said trap door with the result that it is precipitated into the receptacle 13 therebeneath where it is drowned by the liquid contained in the receptacle. The downward movement of the trap door 18 again raises the entrance door 4 whereupon the arm 17 reëngages beneath said door by reason of the overbalancing weight of this end of the trigger plate 16. The trap is now in reset position owing to the automatic action hereinbefore described.

The rodents may be removed from the receptacle by merely tilting the same in the manner shown in Fig. 2 of the drawing or said receptacle may be entirely removed from its operative position, as desired.

It is to be observed that normally when the trap is in set position, the trap door 18 projects a short distance into the mouth of the receptacle 13. This prevents the receptacle from being displaced accidentally or otherwise when the trap is set. When, however, the entrance door 4 is closed the trap door 18 is raised out of the path of movement of the receptacle so that the latter may readily be tilted.

It has been my aim in the construction of this trap to provide a simplified arrangement and one which may readily be manufactured at a comparatively small expense.

Having thus described my invention, what I claim as new is:

1. In a trap, the combination of a covered entrance passage, a bait holding member suspended therein from the upper wall but open only to the exterior, a removable receptacle disposed on said passage and constituting a cover for said bait holding member, a passage leading from the entrance passage to the receptacle, a door for said entrance passage, and means arranged beneath the bait holding member and operable to release the door.

2. In a trap, the combination of an entrance passage, a receptacle disposed thereon and tiltable laterally to permit access to said receptacle, a trap door arranged over the mouth of the receptacle and normally projecting into the receptacle to prevent lateral movement thereof when the trap is set, and means for operating said trap door in the springing of the trap to displace said trap door and thereby permit movement of the receptacle.

3. In a trap, the combination of an entrance passage, a receptacle disposed thereon and tiltable laterally to permit access thereto, a trap door arranged over the mouth of the receptacle and normally projecting into the receptacle to prevent lateral movement thereof when the trap is set, a door for the entrance passage aforesaid, and an operative connection intermediate the last-mentioned door and the trap door whereby to withdraw the latter from the receptacle to permit movement thereof when the entrance door is closed.

In testimony whereof I affix my signature.

HENRY MARKSTEIN.

Copies of this patent may be obtained for five cents each, by addressing the "Commissioner of Patents, Washington, D. C."